US005183140A

United States Patent [19]

Nicoll

[11] Patent Number: 5,183,140

[45] Date of Patent: Feb. 2, 1993

[54] TORQUE LIMITING MECHANISM FOR USE IN A DRIVE SYSTEM

[75] Inventor: Kenneth A. Nicoll, Dundee, Scotland

[73] Assignee: NCR Corporation, Dayton, Ohio

[21] Appl. No.: 841,245

[22] Filed: Feb. 24, 1992

Related U.S. Application Data

[63] Continuation of Ser. No. 697,352, May 6, 1991.

[30] Foreign Application Priority Data

Nov. 16, 1990 [GB] United Kingdom ................ 9024988

[51] Int. Cl.$^5$ ........................................ F16D 43/20

[52] U.S. Cl. ................................ 192/56 R; 464/30

[58] Field of Search ................ 464/30, 37; 192/56 R, 192/46

[56] References Cited

U.S. PATENT DOCUMENTS

| | | | |
|---|---|---|---|
| 1,468,322 | 9/1923 | Odom | 464/23 |
| 2,104,920 | 1/1938 | Yaskin | 464/37 |
| 2,563,112 | 8/1951 | Hill et al. | 58/83 |
| 2,656,185 | 10/1953 | Bach | 271/41 |
| 3,019,595 | 2/1962 | Murrie | 192/56 R |
| 3,144,789 | 8/1964 | Ladin | 464/37 X |
| 3,589,486 | 6/1971 | Kelch | 192/46 |
| 3,667,307 | 6/1972 | Kelch | 192/46 |
| 3,928,862 | 12/1975 | Ivester et al. | 192/46 X |
| 4,218,896 | 8/1980 | Van Der Lely | 192/56 R |
| 4,287,974 | 9/1981 | Krejci | 192/56 R |
| 4,317,253 | 3/1982 | Gut | 192/56 R X |
| 4,327,563 | 5/1982 | Allmacher | 464/37 |
| 4,352,710 | 10/1982 | Makley | 192/46 X |
| 4,401,006 | 8/1983 | Sekiguchi | 192/46 X |
| 4,570,769 | 2/1986 | Isaka | 192/46 |
| 5,000,721 | 3/1991 | Williams | 192/46 X |

FOREIGN PATENT DOCUMENTS

| | | |
|---|---|---|
| 0076702 | 10/1982 | European Pat. Off. . |
| 1376669 | 9/1964 | France . |
| 734449 | 5/1980 | U.S.S.R. . |
| 2022199A | 12/1979 | United Kingdom . |

OTHER PUBLICATIONS

U.S. Patent Application, Ser. No. 678,921, filed Apr. 1, 1991, assigned to NCR Corporation.

Informational item by Machine Components Corporation, entitled "Overload Protection Phasing Clutch" (undated).

*Primary Examiner*—Rodney H. Bonck
*Assistant Examiner*—Andrea Pitts
*Attorney, Agent, or Firm*—Albert L. Sessler, Jr.

[57] ABSTRACT

The invention relates to a torque limiting mechanism comprising rotatable drive and driven members (144,146) having a common axis of rotation. The drive member (144) includes a resilient tripping finger (152) having an end portion (154) which is adapted to engage resiliently in a recess (166) formed in the inner surface of a cylindrical portion (162) of the driven member (146) for the purpose of applying a driving torque to the driven member (146). In the event of this torque exceeding a certain limit, the tripping finger (152) is caused to become disengaged from the recess (166), thereby disconnecting the drive to the driven member (146) and permitting the drive member (144) to rotate relative to the driven member (146). The torque limiting mechanism may be included in a drive system included in a currency note pick mechanism, the torque limiting mechanism serving to disconnect drive to the pick mechanism in the event of a gulp feed occurring.

8 Claims, 6 Drawing Sheets

TORQUE LIMITING MECHANISM FOR USE IN A DRIVE SYSTEM

This is a continuation of co-pending application Ser. No. 697,352 filed on May 6, 1991.

CROSS-REFERENCE TO RELATED APPLICATION

Sheet Handling Apparatus, copending application, 07/697,352 filed May 5, 1991, invented by Kenneth A. Nicoll, assigned to NCR Corporation.

BACKGROUND OF THE INVENTION

This invention relates to a torque limiting mechanism for use in a drive system.

The invention has application, for example, to the drive mechanism of a cash dispenser unit of an automated teller machine (ATM) in which there is provided a currency note picking apparatus for extracting notes from one or more currency cassettes mounted in the cash dispenser unit. As is well known, in operation of an ATM a user inserts a customer identifying card into the machine and then enters certain data (such as codes, quantity of currency required or to be paid in, type of transaction, etc.) upon one or more keyboards associated with the machine. The machine will then process the transaction, update the user's account to reflect the current transaction, dispense cash, when requested, extracted from one or more currency cassettes, and return the card to the user as part of a routine operation.

One known kind of cash dispenser unit of an ATM includes a currency note pick mechanism which incorporates pivotably mounted pick arms disposed adjacent an associated currency cassette, the pick arms being arranged to draw part of an end note of a stack of notes in the cassette away from the remainder of the stack, by applying suction force to the end note, and to position said part for engagement by transport means arranged to remove the end note from the cassette. In a typical cash dispensing operation, the transport means feed a plurality of notes one by one to note stacking means where the notes are stacked in a bundle, the bundle of notes then being fed to an output station, represented by a cash exit slot, for collection by a user of the ATM.

It can sometimes happen that, in operation of a currency note pick mechanism, due to a malfunction of the mechanism a so-called gulp feed occurs in which a plurality of currency notes, instead of a single note, are erroneously picked from the cassette in one cycle of operation of the pick mechanism. Such a malfunction may occur, for example, if the cassette has been loaded incorrectly, or if a note pusher mechanism in the cassette has become jammed. When there occurs a gulp feed involving more than a critical number of notes, the gear wheels driving the note transport means may be highly stressed and one or more gear wheels may fail. Even though only one gear wheel may fail as a result of a gulp feed, all other gears in the driving system will have been so highly stressed that it is likely that further use will soon result in more failures. Thus, once such a gulp feed has occurred, it is likely that a major gear change will be required before the pick mechanism can be used again with any confidence.

SUMMARY OF THE INVENTION

According to the invention, there is provided a torque limiting mechanism for use in a drive system comprising first and second rotatable members, one of which serves as a driving member and rotates in a given direction of rotation and the other of which serves as a driven member, said first and second rotatable members having a common axis of rotation, said first rotatable member being positioned within said second rotatable member; said first rotatable member including an annular cylindrical hub portion having an internal circular bore, and a single integral resilient finger, having substantially the same width as said cylindrical hub portion, projecting from an outer surface of said cylindrical hub portion, said integral resilient finger including a first radially projecting portion adjacent to the cylindrical hub portion, an integral central portion arcuately concentric with and spaced from said cylindrical hub portion and connected at one end to said first radially projecting portion and an engaging end portion connected to the other end of said integral central portion; said second rotatable member including a hollow cylindrical portion of approximately the same width as said cylindrical hub portion for receiving said cylindrical hub portion of said first rotatable member, said hollow cylindrical portion including a single recess for receiving the engaging end portion of the integral resilient finger of said first rotatable member, said engaging end portion engaging resiliently in said recess to cause a driving torque to be applied to said driven member, said integral resilient finger disengaging from said recess when said driving torque exceeds a certain limit so as to enable said driving member to rotate relative to said driven member, said recess and said engaging end portion of said integral resilient finger each extending substantially for the width of the hollow cylindrical portion of the second rotatable member in a direction parallel to said axis of rotation.

It is an object of the present invention to provide a torque limiting device which is of simple construction and which is suitable for use in disconnecting drive to a currency note picking machine in the event of the occurrence of a gulp feed involving more than a critical number of notes.

With this and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
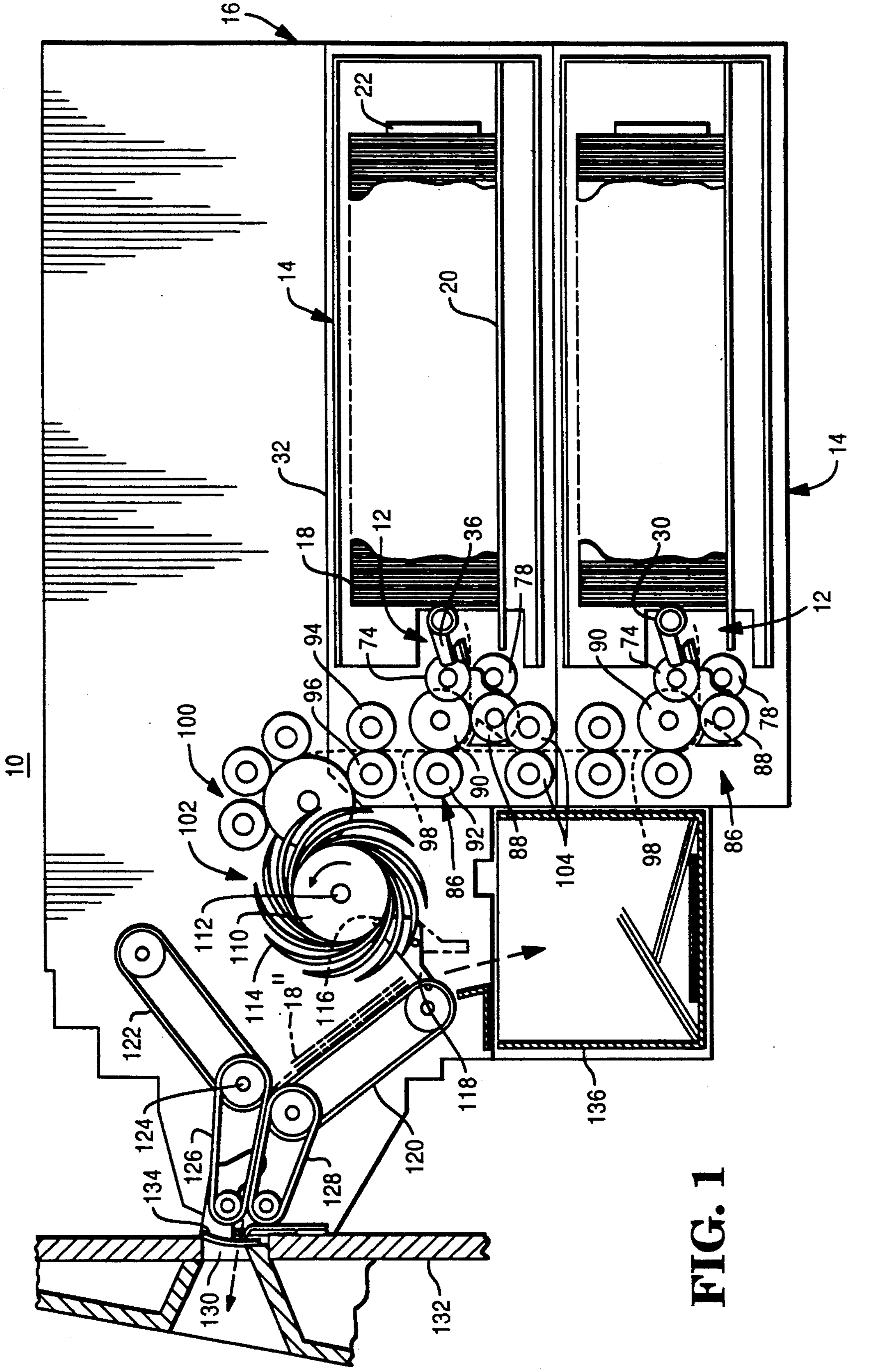
FIG. 1 is a schematic side elevational view of a cash dispenser unit of an ATM having two pick mechanisms, with parts of said unit being omitted.

Referring to FIG. 1, the cash dispenser unit 10 shown therein includes two similar pick mechanisms 12 arranged one above the other and respectively associated with two currency cassettes 14 which are removably mounted in a supporting framework 16 of the dispenser 10. Each of the cassettes 14 is arranged to contain a stack of currency notes 18, corresponding long edges of which are supported on a horizontal support plate 20 mounted in the cassette 14. The two cassettes 14 respectively contain notes 18 of different denominations.

Figure 2:
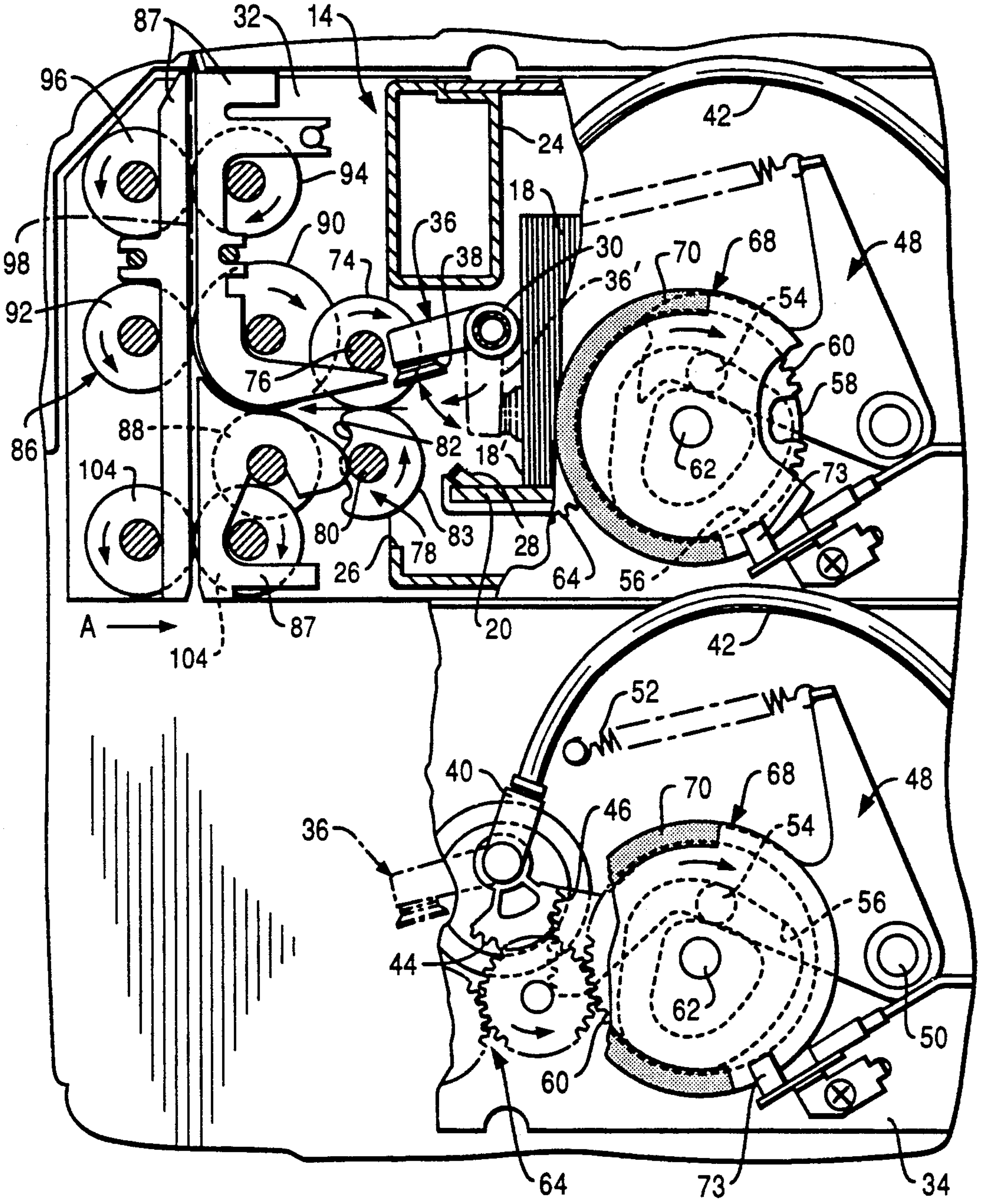
FIG. 2 is an enlarged part sectional side elevational view of part of the cash dispenser unit of FIG. 1, shown broken away.

Referring now additionally to FIG. 2, the stack of notes 18 in each cassette 14 is urged by a spring loaded pusher member 22 (FIG. 1) towards a stop member 24 (FIG. 2) mounted at the front end (left hand end with reference to FIGS. 1 and 2) of the cassette 14. An opening 26 (FIG. 2) is formed in the front end of each cassette 14, the opening 26 being normally closed by conventional shutter means (not shown) when the cassette 14 is not mounted in the dispenser unit 10. When a cassette 14 is mounted in its correct operational position in the dispenser unit 10, the relevant shutter means is automatically retracted away from its closed position so as to enable currency notes 18 to be extracted through the opening 26 by the associated pick mechanism 12. Brushes 28 are provided at the front end of the support plate 20 of each cassette 14 for a purpose which will be explained later.

Each pick mechanism 12 includes a tubular member 30 which extends between, and is rotatably mounted with respect to, side walls 32 and 34 of the framework 16. Two conventional pick arms 36, each incorporating a rubber suction pad 38, are secured on each tubular member 30, each pick arm 36 communicating with the interior of the associated tubular member 30. Corresponding ends of the tubular members 30 project beyond the side wall 34, and are each connected by a respective swivel elbow connector 40 to a respective rubber tube 42 via which reduced pressure is applied in operation to the respective tubular member 30.

Figure 4:
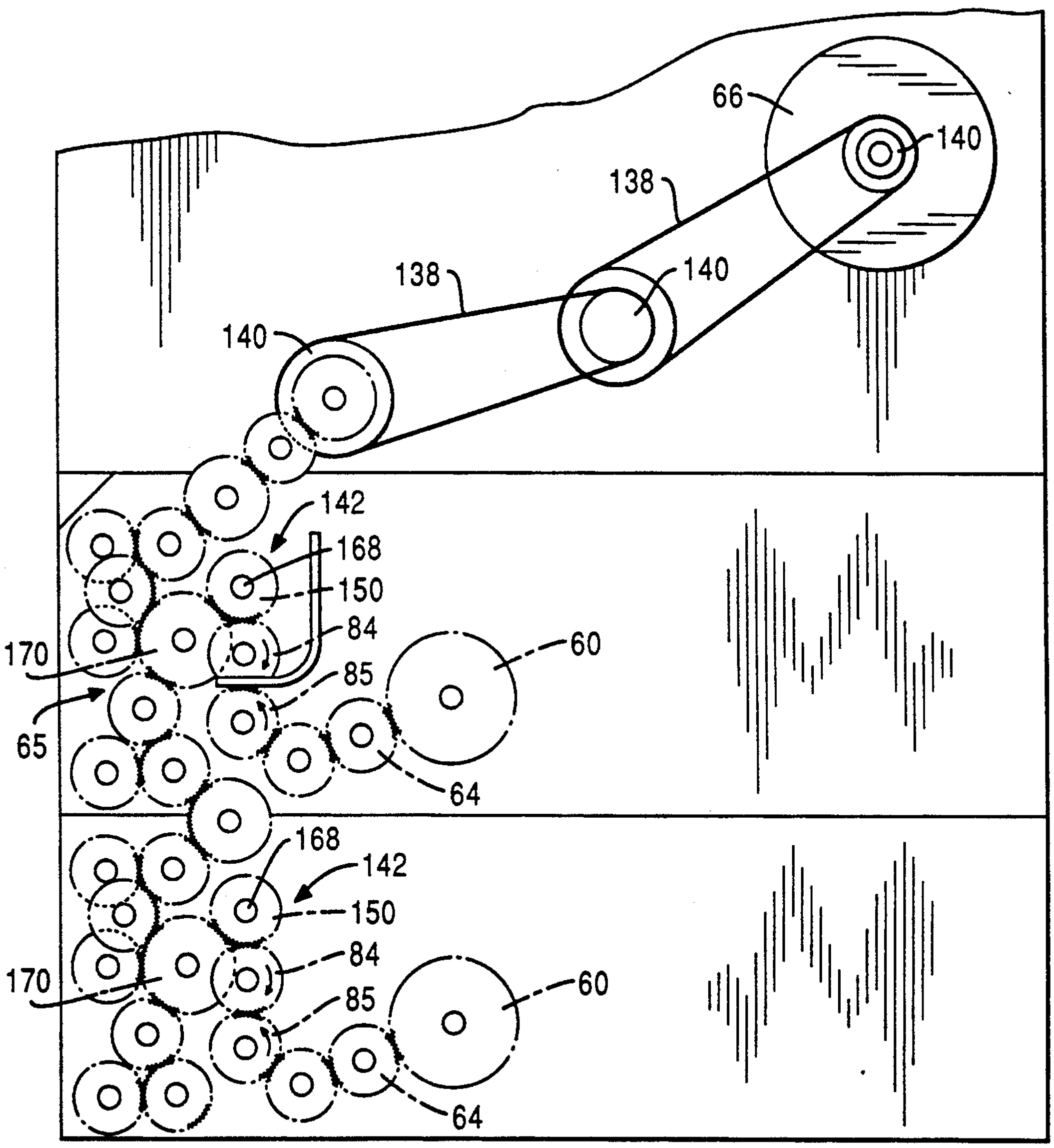
FIG. 4 is a side elevational view showing the drive mechanism for the mechanisms and associated transport mechanisms.
Figure 9:
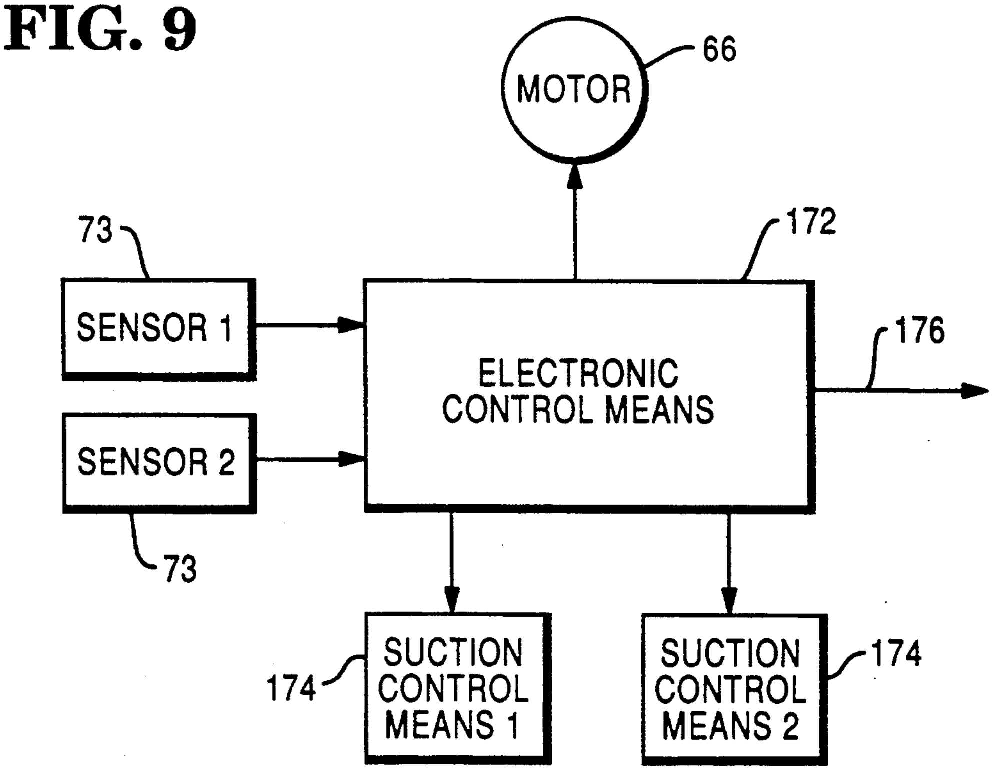
FIG. 9 is a schematic block diagram illustrating electrical interconnections between parts of the cash dispenser unit.

A gear segment 44 is secured to that part of each tubular member 30 projecting beyond the side wall 34, the gear segment 44 being in cooperative engagement with a toothed end portion 46 of a first arm of a respective bell crank lever 48 which is pivotably mounted on a stud 50 secured to the outer surface of the wall 34. Each lever 48 is urged to rotate in a counterclockwise direction with reference to FIG. 2 by means of a spring 52 the ends of which are respectively attached to the side wall 34 and to the end of the second arm of the lever 48. A stud 54 is secured to one side of each lever 48, the stud 54 engaging in a cam track 56 formed in an associated cam member 58. Each cam member 58 is secured to a respective gear wheel 60 which is rotatably mounted on a respective shaft 62 projecting from the outer surface of the side wall 34. The gear wheels 60 are driven by gear wheels 64 forming part of a gear mechanism 65 (FIG. 4) operated by a main drive electric motor 66 (FIGS. 4 and 9). In operation, with the motor 66 energized, the gear wheels 60 are rotated in a clockwise direction with reference to FIG. 2. This rotation of the gear wheels 60 brings about an oscillatory pivotal movement of the levers 48 by virtue of the engagement of the studs 54 in the cam tracks 56, the springs 52 holding the studs 54 in engagement with the inner edges of the cam tracks 56. By virtue of the engagement of the gear segments 44 with the toothed portions 46 of the levers 48, the oscillatory movement of the levers 48 brings about an oscillatory pivotal movement of the assemblies of the tubular members 30 and the associated pick arms 36. As will be explained in more detail later, the oscillatory movement of either of the assemblies of the tubular members 30 and associated pick arms 36 is effective to cause currency notes to be picked one by one from the stack of currency notes 18 held in the associated currency cassette 14.

A timing disc 68 is secured to that face of each gear wheel 60 remote from the associated cam member 58. Each timing disc 68 is for the most part transparent but incorporates an arcuate opaque strip 70 extending around just over half the periphery of the disc 68. Each timing disc 68 is associated with optical sensing means, comprising an LED (not shown) and a cooperating phototransistor sensor 73, which is arranged to sense the opaque strip 70. In operation, as each assembly of a gear wheel 60 and the associated cam member 58 and timing disc 68 rotates in response to energization of the motor 66, the associated sensor 73 generates output signals in response to the sensing of the leading and trailing edges of the associated opaque strip 70. It should be understood that the signals generated by each of the sensors 73 provide indications as to the precise positions of the associated pick arms 36 at the times when these signals are generated.

Figure 3:
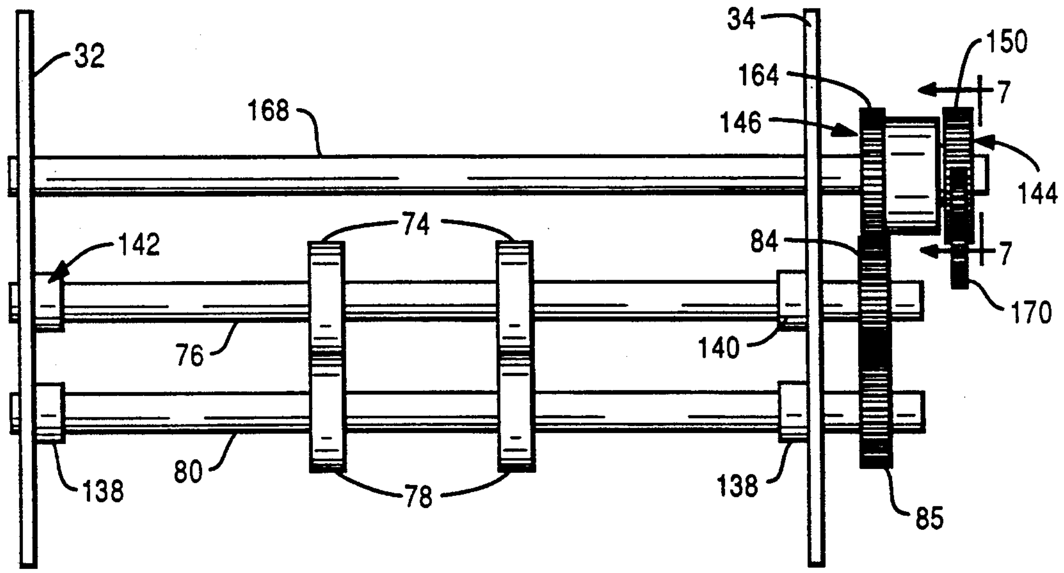
FIG. 3 is an elevational view of part of one of the pick mechanisms, the view being taken in the direction of the arrow A in FIG. 2.

Referring now also to FIG. 3, each pick mechanism 12 also includes a first pair of rolls 74 secured on a drive shaft 76, and a second pair of rolls 78 (hereinafter referred to as cam rolls) which are secured on a drive shaft 80 in cooperative relationship with respect to the rolls 74, and whose peripheries comprise low portions 82 and high portions 83. The drive shafts 76 and 80 extend between, and are rotatably mounted with respect to, the side walls 32 and 34, and are respectively driven by two gear wheels 84 and 85 forming part of the gear mechanism 65 so that in operation the rolls 74 and the cam rolls 78 respectively rotate in clockwise and counterclockwise directions with reference to FIG. 2, the rolls 74 and the cam rolls 78 making two revolutions for each revolution of the timing discs 68. In the course of a normal pick operation, the lower long edge of the first currency note 18' of the stack of notes 18 in the relevant cassette 14 is pulled partly out of the cassette 14, under the action of suction force applied by the respective pick arms 36, and is fed between the low portions 82 of the respective cam rolls 78 and the associated rolls 74 as the arms 36 are pivoted in a clockwise direction from the position 36' shown in chain outline in FIG. 2 to the position shown in the solid outline. The note 18' is thereafter pulled completely out of the cassette 14 by virtue of being gripped between the rolls 74 and the high portions 83 of the cam rolls 78.

The cash dispenser unit 10 includes two note transport mechanisms 86 respectively associated with the two pick mechanisms 12, the transport mechanisms 86 being driven by the gear mechanism 65 previously referred to. Each transport mechanism 86 includes guide means 87 and sets of feed rolls 88, 90, 92, 94, and 96 for feeding a currency note picked by the associated pick mechanism 12 along a respective feed path 98 towards a further transport mechanism 100 which is positioned above the mechanisms 86 and which is also driven by the motor 66 via transmission means (not shown). The transport mechanism 100 serves to feed currency notes one by one to a conventional stacking wheel 102. The sets of cam rolls 78 and cooperating rolls 74 of each pick mechanism 12 feed a picked currency note to cooperating sets of rolls 88 and 90, from where the note is fed by cooperating sets of rolls 90 and 92 and cooperating sets of rolls 94 and 96 upwardly out of the respective transport mechanism 86. The upper one of the transport mechanisms 86 additionally includes two further sets of cooperating rolls 104 for accepting a currency note fed upwardly out of the lower transport mechanism 86 and for feeding this note to the cooperating rolls 90 and 92 of the upper mechanism 86, from where the note is fed to the transport mechanism 100.

Referring now particularly to FIG. 1, the stacking wheel 102 is driven by the motor 66 and is arranged to rotate continuously in operation in a counterclockwise direction. Means (not shown) are provided between the upper transport mechanism 86 and the stacking wheel 102 for detecting any multiple feeding of notes and for detecting any invalid or torn note. The stacking wheel 102 comprises a plurality of stacking plates 110 spaced apart in parallel relationship along the stacker wheel shaft 112, each stacking plate 110 incorporating a series of curved tines 114. The tines 114 of the stacking plates 110 pass between portions 116 of a rockably mounted stripper plate assembly 118. In operation, each note fed by the transport mechanism 100 to the stacking wheel 102 enters between adjacent tines 114 and is carried partly around the axis of the stacking wheel 102, the note being stripped from the wheel 102 by the portions 116 and being stacked against belt means 120 with a long edge of the note resting on the stripper plate assembly 118. The belt means 120 cooperates with belt means 122 normally held in the position shown in FIG. 1. When a bundle of notes 18" (or possibly a single note only) to be dispensed to a user in response to a cash withdrawal request has been stacked against the belt means 120, the belt means 122 is rocked in a clockwise direction about a shaft 124 so as to trap the bundle of notes 18" between the belt means 120 and the belt means 122. It should be understood that in the course of this rocking movement separate belts making up the belt means 122 pass between adjacent pairs of the stacking plates 110.

Assuming that none of the notes in the bundle 18" have been rejected for any reason, the belt means 120 and 122 are operated so as to drive the bundle 18"to a pair of drive belt means 126 and 128. The belt means 126 and 128 serve to drive the bundle 18"through a note exit slot 130 in a housing 132 of the ATM to a position where the bundle 18" can be collected by the user of the ATM, a shutter 134 which serves to close the slot 130 when the ATM is not in operation having previously been retracted to an open position. It should be understood that the belt means 120 and 122 are mounted in resilient relationship relative to each other, and the belt means 126 and 128 are also mounted in resilient relationship relative to each other, so that bundles of notes of varying thickness can be held between, and fed by, the belt means 120 and 122 and the belt means 126 and 128. If a multiple feeding has been detected in the course of stacking the bundle of notes 18" against the belt means 120, or if one or more of the notes in the bundle 18" have been rejected for any other reason, then the stripper plate assembly 118 is rocked into the position shown in chain outline in FIG. 1, and the belt means 120 and 122 are operated to feed the bundle 18" in a direction opposite to the normal feed direction, the bundle 18" being deposited in a reject note container 136 via an opening in the top thereof.

Referring now again to FIG. 3, together with FIGS. 4, 5A and 5B, 6A and 6B and FIG. 7, the gear mechanism 65, which is driven by the electric motor 66 via belts 138 and pulleys 140 (FIG. 4), includes two torque limiting mechanisms 142 respectively associated with the two pick mechanisms 12. Each torque limiting mechanism 142 comprises a drive member 144 (best shown in FIGS. 5A and 5B), and a driven member 146 (best shown in FIGS. 6A and 6B), each of the members 144 and 146 being of unitary construction and being formed of moulded plastic such as an acetal resin.

Figure 5A:
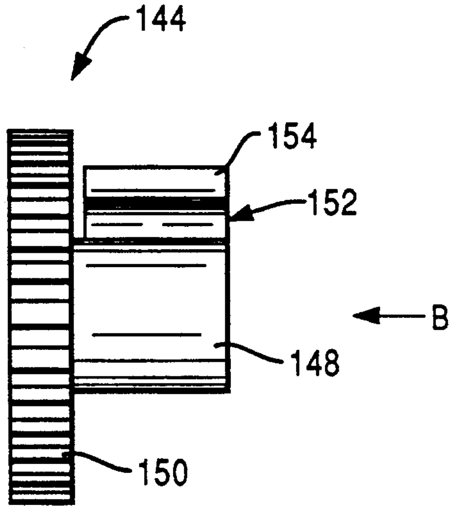
FIGS. 5A and 5B are respectively enlarged side and end views of a drive member of a torque limiting mechanism in accordance with the invention included in the drive mechanism of FIG. 4, the view shown in FIG. 5B being taken in the direction of the arrow B in FIG. 5A.
Figure 5B:
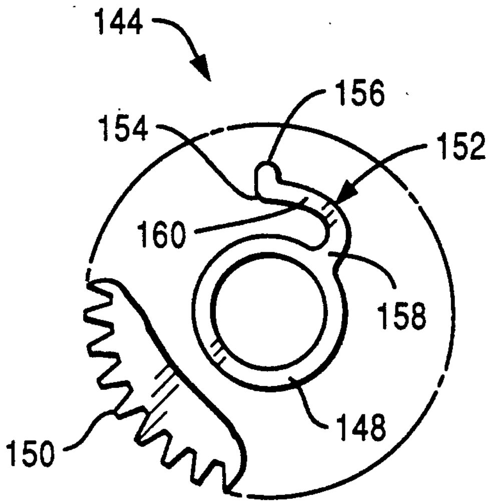

Referring particularly to FIGS. 5A and 5B, the drive member 144 includes a hollow cylindrical hub portion 148 formed integral at one end with a gear wheel portion 150. A resilient tripping finger 152 projects from the outer surface of the hub member 148, the free end portion 154 of the tripping finger 152 having a rounded extremity 156 facing away from the hub portion 148. The end portion 154 is offset in a counterclockwise direction (with reference to FIG. 5B) from the portion 158 of the tripping finger 152 which adjoins the hub portion 148. The portions 154 and 158 of the tripping finger 152 are connected together by an integral central portion 160 which extends around approximately one eighth of the circumference of the hub portion 148. As seen in FIG. 5A, the tripping finger 152 extends over the major part of the length of the hub portion 148, with the end portion 154 extending parallel to the axis of the drive member 144. The tripping finger 152 is so constructed that the end portion 154 can be moved inwardly towards the hub portion 148 against the spring action of the finger 152, this spring action tending to restore the finger 152 to its original position.

Figure 6A:
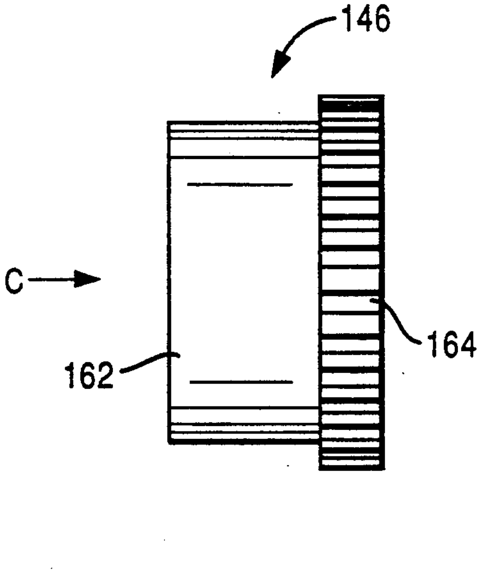
FIGS. 6A and 6B are respectively enlarged side and end views of a driven member of the torque limiting mechanism view shown in FIG. 6B being taken in the direction of the arrow C in FIG. 6A.
Figure 6B:
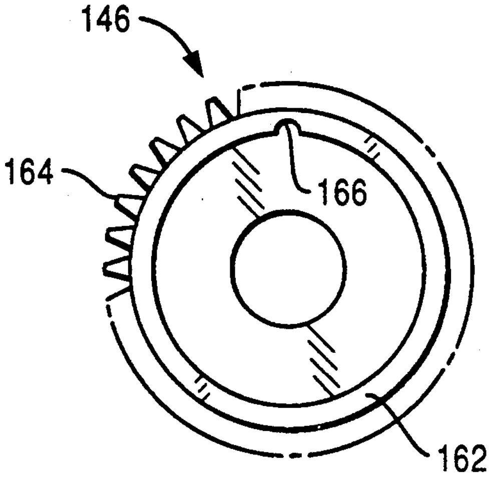

Referring particularly to FIGS. 6A and 6B, the driven member 146 comprises a hollow cylindrical portion 162 and a gear wheel portion 164, the cylindrical portion 162 being integral at one end with the gear wheel portion 164. A recess 166 which has a rounded configuration and which extends along the whole length of the cylindrical portion 162 is formed in the inner surface of the portion 162. The length of the cylindrical portion 162 is slightly greater than the dimension of the tripping finger 152 parallel to the axis of the drive member 144.

Figure 7:
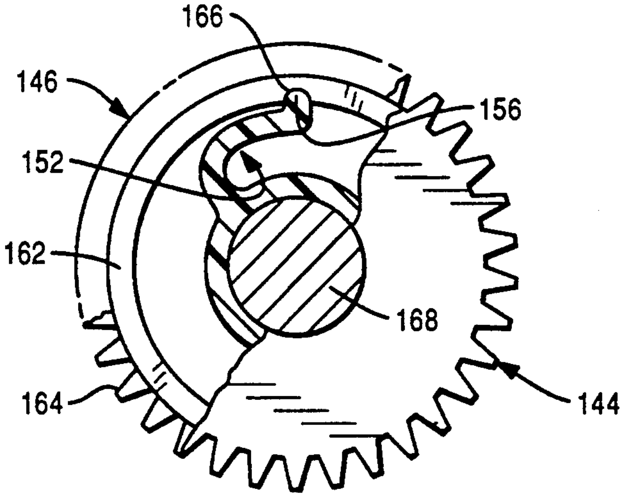
FIG. 7 is a side view of the torque limiting mechanism of FIGS. 5 and 6 shown mounted on a respective shaft, with part of the drive member being broken away.

The drive member 144 of each torque limiting mechanism 142 is rotatably mounted on a respective shaft 168 (FIGS. 3, 4 and 7) which extends between the side walls 32 and 34. As shown in FIGS. 3 and 4, the gear wheel portion 150 of the drive member 144 engages with a respective gear wheel 170 of the gear mechanism 65. The driven member 146 of each torque limiting mechanism 142 is rotatably mounted on the respective shaft 168 with the tripping finger 152 of the drive member 144 disposed inside the cylindrical portion 162 of the driven member 146, the extremity 156 of the end portion 154 nesting in the recess 166 as shown in FIG. 7. It should be understood that the resilient nature of the tripping finger 152 holds the extremity 156 of the end portion 154 resiliently in position in the recess 166. As shown in FIG. 3, the gear wheel portion 164 of the driven member 146 engages with the respective gear wheel 84. In operation of the cash dispenser unit 10, the drive member 144 of each torque limiting mechanism 142 is driven by the respective gear wheel 170 in a counterclockwise direction with reference to FIGS. 4 and 7. In normal operation, this drive is transmitted via the relevant tripping finger 152 to the respective driven member 146 which in turn drives the gear wheels 84, 85, 64 and 60 of the respective pick mechanism 12, thereby rendering this pick mechanism 12 operational. It should be noted that the end portion 154 of the tripping finger 152 is offset from the portion 158 in a direction opposite to the direction of rotation of the drive member 144. As will be explained in more detail later, if due to a malfunction in the pick mechanism 12 the torque applied by the drive member 144 to the driven member 146 exceeds a certain limit, then the end portion 154 of the tripping finger 152 is displaced towards the relevant hub portion 148 out of engagement with the recess 166, against the spring action of the tripping finger 152, thereby allowing the drive member 144 to rotate relative to the driven member 146 with the driven member 146 being stationary. For so long as the condition which gave rise to the malfunction remains, the drive member 144 can continue to rotate relative to the driven member 146 with no drive being transmitted to the relevant pick mechanism 12. It should be understood that although the drive to the pick mechanism 12 in which the malfunction occurred is disconnected, drive continues to be applied in normal manner to the other pick mechanism 12 via the respective torque limiting mechanism 142.

Figure 8A:
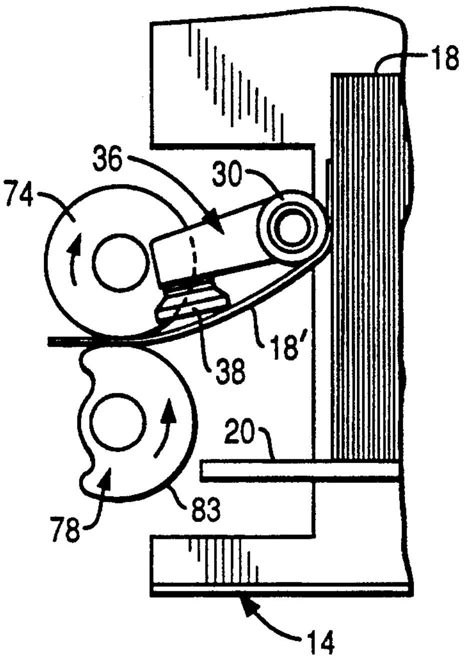
FIGS. 8A and 8B are schematic views respectively illustrating a normal pick operation and a pick operation involving a gulp feed.

The operation of the cash dispenser unit 10 will now be described with additional reference to FIGS. 8A and 8B and FIG. 9. This operation is controlled by electronic control means 172 (FIG. 9) of the cash dispenser unit 10. The electronic control means 172 is connected to the motor 66, to each phototransistor sensor 73, and to a suction control means 174 of each pick mechanism 12. When the main ATM processor (not shown) sends a request to the electronic control means 172 that one or more currency notes are to be dispensed by the dispenser unit 10 in response to a cash withdrawal request by a user of the ATM, the control means 172 sends a signal to the motor 66 so as to switch on the motor 66 and cause the assemblies of the gear wheels 60, cams 58 and timing discs 68 to commence to rotate. Shortly thereafter, the electronic control means 172 initiates the sending of signals to the suction control means 174 of a selected one of the pick mechanisms 12 so as to connect the tubular member 30 of the selected pick mechanism 12 in controlled manner to a source (not shown) of the reduced pressure, thereby initiating the picking of notes from the associated cassette 14. The timing of the application of reduced pressure to the tubular member 30, and hence to the associated suction pads 38, is under the control of signals generated by the phototransistor sensor 73 of the selected pick mechanism 12.

As previously explained, in response to rotational movement of the gear wheel 60 of the selected pick mechanism 12, the pick arms 36 of this pick mechanism 12 will undergo an oscillatory movement. In known manner, while the picking of notes from the associated cassette 14 is taking place, for each pivotal movement of the pick arms 36 in a clockwise direction (with reference to FIG. 2), the pick arms 36 apply a suction force to the first note 18′ of the stack of notes 18 held in the cassette 14 so as to pull the lower part of the note 18′ out of the cassette 14 until the lower end of the note 18′comes into contact with the set of rolls 74.

It should be understood that, as the lower end of the note 18′ is approaching the rolls 74, the low portions 82 of the cam rolls 78 are facing the rolls 74 so that the cam rolls 78 do not interfere with the movement of the note 18′. The suction pads 38 become disengaged from the note 18′ when the high portions 83 of the cam rolls 78 are about to come into cooperative relationship with the rolls 74, and the note 18′ is then gripped between the rolls 74 and the high portions 83 of the cam rolls 78 as shown in FIG. 8A. The rolls 74 and 78 pull the note 18′ away from the cassette 14 until the leading edge of the note 18′enters the nip of the rolls 88 and 90 of the associated transport mechanism 86, after which the note 18′ is pulled completely out of the cassette 14 and fed to the stacking wheel 102 in the manner previously described.

After the note 18′ has been fed to the stacking wheel 102, the electronic control means 172 may cause a series of further pick operations to be carried out in each of which a currency note is picked from one or other of the cassettes 14. Upon the control means 172 ascertaining that the correct number and denomination of currency notes have been picked from the cassettes 14, the control means 172 returns the cash dispenser unit 10 to its quiescent condition by de-energizing the motor 66.

When the first note 18′ is being picked from the associated cassette 14, it is possible, due to a certain amount of porosity of the first note 18′, for the second note of the stack of notes 18 to commence to be drawn away from the remainder of the stack together with the first note 18′. The brushes 28 will normally prevent the second note being drawn out of the cassette 14 together with the first note 18′, since, in the event of the first and second notes commencing to be drawn out of the cassette 14, the brushes 28 flex the lower ends of these notes, thereby interrupting the application of suction force to the second note and so permitting the second note to fall back into its correct position in the cassette 14.

Figure 8B:
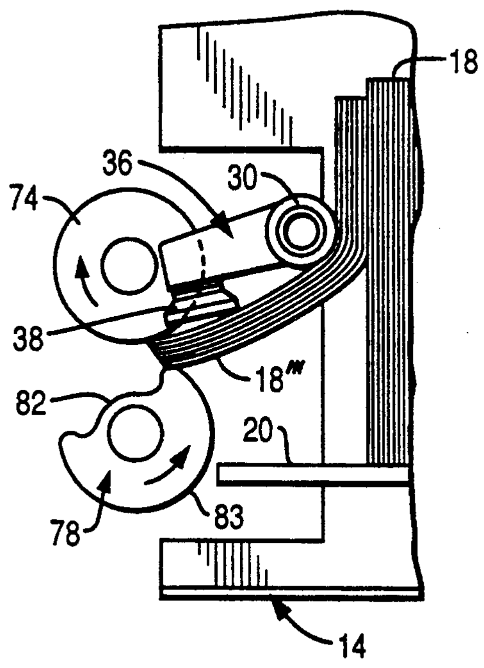

In the event of a gulp feed occurring, for example due to incorrect loading, or jamming of the pusher member 22, of the relevant cassette 14, a bunch of notes 18‴ may be drawn out of the cassette 14 and become gripped between the rolls 74 and the leading edges of the high portions 83 of the cam rolls 78 as shown in FIG. 8B. Following the gripping of the bunch of notes 18‴ between the high portions 83 and rolls 74, an immediate increase occurs in the torque applied by the drive member 144 of the relevant torque limiting mechanism 142 to the associated driven member 146. If the bunch of notes 18‴ has an overall thickness of more than 2 millimeters (representing about 20 notes in number), then this torque will be greater than the limit previously referred to, thereby causing the end portion 154 of the tripping finger 152 of the drive member 144 to become disengaged from the associated recess 166 so as to disconnect the drive to the relevant pick mechanism 12. In response to the sensor 73 of the relevant pick mechanism 12 ceasing to apply timing pulses to the electronic control means 172, the electronic control means 172 sends a signal over an output line 176 to the main ATM processor (not shown), this signal indicating that a gulp feed has occurred in the cash dispenser unit 10.

It should be understood that, when there occurs a gulp feed involving more than a critical number of notes, the relevant driven member 146 is disengaged from the associated drive member 144 before the gear mechanism 65 and associated parts are subjected to any damaging stress. Upon the note jam being cleared by an operator, the pick mechanism 12 in which the gulp feed occurred is ready to recommence operation without any other reservicing being necessary. In this connection, it should be noted that the design of each torque limiting device 142 is such that, when the relevant pick mechanism 12 recommences operation, the drive member 144 re-engages with the associated driven member 146 in exactly the same rotational position relative to the other parts of the pick mechanism 12 as it was in when disengagement occurred. Thus, no resetting of any part of the relevant pick mechanism 12 is necessary prior to it recommencing operation. Also, it should be understood that, following the disengagement of the driven member 146 from the drive member 144 of one of the torque limiting mechanisms 142 as a result of a gulp feed, the note jam may quickly free itself after one or more turns of the drive member 144, in which case the drive member 144 will re-engage automatically with the driven member 146 without the relevant pick mechanism 12 being rendered non-operational.

It will be appreciated that the torque limiting devices 142 provide a simple, cheap and effective means of protecting the cash dispenser unit 10 from damage in the event of a gulp feed occurring.

In the particular embodiment described above, picking of multiple notes having an overall thickness of not more than 2 millimeters by one of the pick mechanisms 12 will not cause a jam or any damage to the gear mechanism 65, such multiple notes being detected by the multiple note detect means previously referred to and being diverted to the reject note container 136.

If it is desired that the drive and driven members of a torque limiting mechanism according to the invention should disengage from each other at a lower level of applied torque compared with the mechanism 142 described above, then the tripping fingers could be redesigned so that the central portion extends around more than one eighth of the circumference of the hub portion. On the other hand, if it is desired that the drive and driven members should disengage from each other at a higher level of applied torque, then the tripping finger could be redesigned so that the central portion extends around less than one eighth of the circumference of the hub portion.

In an alternative arrangement to that described above, the member 146 could act as a drive member with the gear wheel portion 164 engaging with the relevant gear wheel 170, while the member 144 could act as the driven member with the gear wheel portion 150 engaging with the relevant gear wheel 84.

The torque limiting mechanisms 142 described above have application to apparatuses other than currency note pick mechanisms of a cash dispenser unit. Having regard to FIG. 7, if the drive member 144 were driven in a clockwise direction instead of in a counterclockwise direction, then the drive member 144 would only become disengaged from the driven member 146 when the torque applied by the drive member 144 to the driven member 146 reaches a much higher value as compared with the value when disengagement takes place with the drive member 144 being driven in a counterclockwise direction. If a torque limiting device as shown in FIG. 7 were included in the drive mechanism of a sheet feeding device in which the normal feed direction corresponds to rotation of the drive member 144 in a counterclockwise direction (with reference to FIG. 7) then, in the event of a sheet jam occurring, it may be possible to clear the jam by reversing the operation of the drive mechanism, in view of the fact that the maximum possible torque applied by the drive member is greater when it rotates in a direction opposite to its normal direction of rotation.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. A torque limiting mechanism for use in a drive system, comprising:

first and second rotatable members, one of which serves as a driving member and rotates in a given direction of rotation and the other of which serves as a driven member, said first and second rotatable members having a common axis of rotation, said first rotatable member being positioned within said second rotatable member;

said first rotatable member including an annular cylindrical hub portion having an internal circular bore, and a single integral resilient finger, having substantially the same width as said cylindrical hub portion, projecting from an outer surface of said cylindrical hub portion, said integral resilient finger including a first radially projecting portion adjacent to the cylindrical hub portion, an integral central portion arcuately concentric with and spaced from said cylindrical hub portion and connected at one end to said first radially projecting portion and an engaging end portion connected to the other end of said integral central portion;

said second rotatable member including a hollow cylindrical portion of approximately the same width as said cylindrical hub portion for receiving said cylindrical hub portion of said first rotatable member, said hollow cylindrical portion including a single recess for receiving the engaging end portion of the integral resilient finger of said first rotatable member; said engaging end portion engaging resiliently in said recess to cause a driving torque to be applied to said driven member, said integral resilient finger disengaging from said recess when said driving torque exceeds a certain limit so as to enable said driving member to rotate relative to said driven member, said recess and said engaging end portion of said integral resilient finger each extending substantially for the width of the hollow cylindrical portion of the second rotatable member in a direction parallel to said axis of rotation.

2. The torque limiting mechanism of claim 1, in which said integral central portion extends around approximately one eighth of the circumference of the hub portion.

3. The torque limiting mechanism of claim 1, in which the end portion of said resilient tripping finger is offset along the circumference of the hub portion from said first portion by said central portion in a direction opposite to the direction of rotation of said first member of said torque limiting device.

4. The torque limiting mechanism of claim 1, in which the end portion of the tripping finger of the first member is movable radially inwardly toward the center of the hub portion and out of engagement with the recess in the hollow cylindrical portion of the second member when the torque applied by the first member to the second member exceeds said predetermined limit.

5. The torque limiting mechanism of claim 1, in which said recess and said end portion of said resilient member each extend in a direction parallel to said axis of rotation.

6. The torque limiting mechanism of claim 1, in which said end portion of said resilient member and said recess each have a rounded configuration.

7. The torque limiting mechanism of claim 1, in which each of said first and second members is of acetal resin molded plastic.

8. The torque limiting mechanism of claim 1, in which said first and second members respectively include first and second gear wheel portions.

* * * * *